(12) United States Patent
Butlin

(10) Patent No.: US 9,846,489 B1
(45) Date of Patent: Dec. 19, 2017

(54) TRAVERSE ROW PATTERN TAPERED SHAPED INVERTED KEY KEYBOARD

(71) Applicant: Peter John Butlin, Birmingham (GB)

(72) Inventor: Peter John Butlin, Birmingham (GB)

(73) Assignee: Peter John Butlin (GB)

( * ) Notice: Subject to any disclaimer, the term of this patent is extended or adjusted under 35 U.S.C. 154(b) by 0 days.

(21) Appl. No.: 15/216,428

(22) Filed: Jul. 21, 2016

(51) Int. Cl.
*G06F 3/02* (2006.01)

(52) U.S. Cl.
CPC .......... *G06F 3/0216* (2013.01); *G06F 3/0219* (2013.01); *G06F 3/0221* (2013.01)

(58) Field of Classification Search
CPC .................................................... G06F 3/0216
USPC .......................................................... 345/178
See application file for complete search history.

(56) References Cited

U.S. PATENT DOCUMENTS

| 5,741,990 | A | * | 4/1998 | Davies | G09B 15/004 84/423 R |
| 6,646,572 | B1 | * | 11/2003 | Brand | G06F 3/0219 341/22 |
| D501,001 | S | * | 1/2005 | Pottie | D14/247 |
| 8,987,573 | B1 | * | 3/2015 | Lippens | G09B 15/002 84/423 R |
| 2003/0063070 | A1 | * | 4/2003 | Kang | G06F 1/1626 345/168 |
| 2006/0253793 | A1 | * | 11/2006 | Zhai | G06F 3/04883 715/773 |
| 2008/0218484 | A1 | * | 9/2008 | Nishiwaki | G06F 3/0216 345/169 |
| 2010/0251161 | A1 | * | 9/2010 | Fong et al. | G06F 3/0233 715/773 |
| 2011/0134140 | A1 | * | 6/2011 | Kang | G06F 3/04886 345/619 |
| 2013/0215153 | A1 | * | 8/2013 | Park | G09G 5/363 345/650 |
| 2014/0152574 | A1 | * | 6/2014 | Akkok | G06F 3/04886 345/169 |

\* cited by examiner

Primary Examiner — Jason Olson

(57) ABSTRACT

A keyboard with key rows in a traversing linear row arrangement that intermesh with the linear row immediately above and/or below, with alternating inverted tapering offset keys. This allows keys to be kept in order while giving each key a less narrow and more broad profile to allow a wider area for the fingers to strike, while not decreasing the number of keys on a line or widening the keyboard and allowing for a more elongated height keyboard over all. This is to make the keyboard more suited to and targetable by human fingers and better use of the finite surface area of the keyboard.

1 Claim, 5 Drawing Sheets

TRAVERSE ROW PATTERN TAPERED SHAPED INVERTED KEY KEYBOARD

PRIOR DISCLOSURE

This is a full patent submission following on from the provisional application 62/195,405. In August of 2015 this design was disclosed to 6 mobile phone companies; Apple, Motorola, Google, Blackberry, Microsoft, and Amazon by letter.

BACKGROUND OF THE INVENTION

Most people in the Common Era are familiar with the standard QWERTY keyboard for data entry. For the purposes of this document the keyboard is to be treated in a 2 dimensional format. The height, column or longitude of the keys/keyboard refers to the dimension that one perceives the keyboard at when looking at it face on, or if one tilted the keyboard vertically, the characters of the alphabet to be kept in there normal orientation with the spacebar at the base, the column going through the keys 'T G V'. Latitudinal row or horizontal means the other dimension, going through the keys 'Q W E R T Y U I O P'

Keyboards are designed in ideal situations to be suited for ease of input. The standard desktop computer keyboard has square keys that are sometimes concave, in a conventional square row and column arrangement, to allow the human finger to strike an amenable keyface area, and a uniform appearance for ease of key location. Most keyboards have an area surrounding each key to allow a buffer between its neighbouring keys to stop two keys being struck at once. They are arranged for two handed use, and are right handed orientated, with the least popular keys (namely Z X Q) put on the outer edges of the left hand side. Due to the square keys of a standard keyboard, computer keyboards are generally oblong, two to four times in latitudinal width as longitudinal height. The human finger has a circular contact point and a circular to oval profile, wider across the lateral than the longitudinal, where as the keys and buffer zone is square. Human fingers are fairly circular at the tip contact point and more oval in profile across the nail. Keys are sometimes shrunk latitudinaly or elongated where the greatest pressure on design limitation is, and the ease of use suffers. In certain situations keyboard size is limited and the width needed for a standard keyboard is not possible, and this restricts the size shape and number of the keys. Multi touch data input arrays are time consuming, and other keyboards are poorly suited ergonomically to human fingers and hands, keyboards are compressed latitudinaly giving vertically elongated keys are not suited to the human finger. This invention is to allow for a better suited keyboard for finger touch, and hand access, and make better use of the buffer area between keys.

SUMMARY

This keyboard is designed with the intention to make keys more easily targetable by the human finger, by making the keys bigger As is seem in the illustrations, there are many designs of the same idea, these are for a standard qwerty layout keyboard comprising of 3 rows, and a 4th row of different sized function keys, such as a spacebar, command key, a shift key. Some examples interlink and tessellate without gaps, some have rounded, and it is also possible to have the keys in sets of blocks that are offset as a group, and the horizontal row traverses with each block of keys. It is possible to have a mixture of conventional and tapered key keyboards.

Fundamentally all keyboard layouts illustrated have the same principle invention. To maximise the useful area on each key in this invention, the keys on each row are to have tapered shaped keys (or key blocks), with the orientation of each tapered key (or key block) inverted and placed higher or lower in comparison to its neighbouring keys (or key block) left and right, and being offset up or down this then giving the horizontal rows a traversing linear zig zag horizontal linear row profile. This zig zag linear horizontal key row profile formation, will then correlate to the zig zag linear row profile of a line of keys above or below interlocking with them, filling the concave space of the row of keys above or below with the convex of it's own traversment, The traversing key rows correspond with the row above or below utilising the concaves of one row to birth the convexes of another row.

This arrangement makes each key easier to use for the human finger tip, whilst at the same time making better use of the finite space available on the keyboard. As the keys are offset from there neighbouring keys in the row, the centres of each key become further apart. The tapering keys exhibit a wider face in comparison to what is possible with a rectangle key format keyboard and the keys have a more oval outline similar in shape to the shape of the human finger than the standard rectangle keys on a keyboard. The arrangement has a wider and more usable area for each key and the linear row profile a longer length whilst the keyboards width stays the same as the surplus space is used.

As the human finger tip is not square, but naturally round to oval horizontally, this keyboard also uses the traversement of the key row as the key buffer, utilising the buffer inbetween its adjacent key, and better utilises the finite space of the keyboard. The buffer space between each key is repositioned, the traversement shaping the key buffer between adjacent rows with wider keys taking up the surplus space from its adjacent keys and the keys repositioned so as the key buffer exhibits a shape similar the round or oval shape of the human finger.

This keyboard layout also allows the surface area of the keyboard to be less oblong horizontally and more elongated in height if required, or in other words more squared than the standard oblong keyboard layout, ideal for one handed input, without being detrimental to the ergonomic usability of the keys.

Allows keys to be kept in formal row and column arrangement for location and recognition. The rows have a traversing pattern inbetween its adjacent row(s) given to it by its offset keys, but in clearly distinct lines in the row profile, not an equal pattern throughout the individual keys on the keyboard. The rows intermesh, but they are in clearly distinct rows. They are clearly not a Regular Tessellation of triangles rectangles or hexagons, or in anyway similar to these uniform tiling patterns, as such patterns disorientate and transcend from the familiar QWERTY layout of columns and rows.

DETAILED EXPLANATION OF INVENTION RELATING TO ALL ASPECTS OF INVENTION UTILISING DRAWINGS

Figure 1:
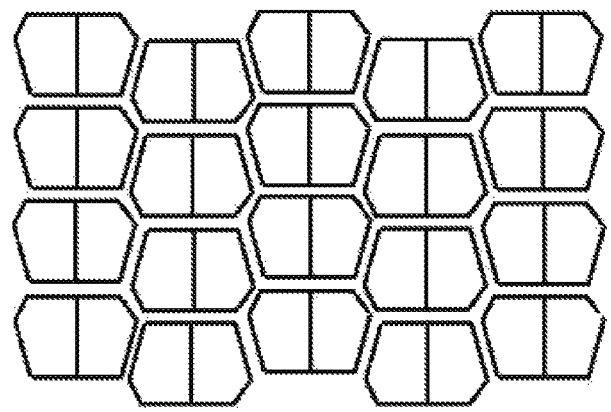
FIG. 1 is a collection of several keyboard designs of the same method of construction
Figure 1:
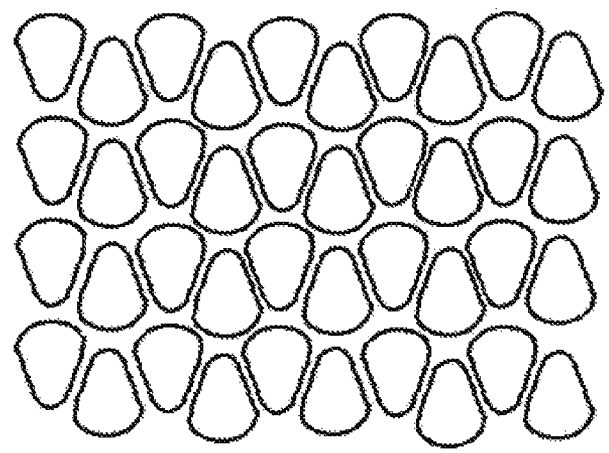
Figure 1:
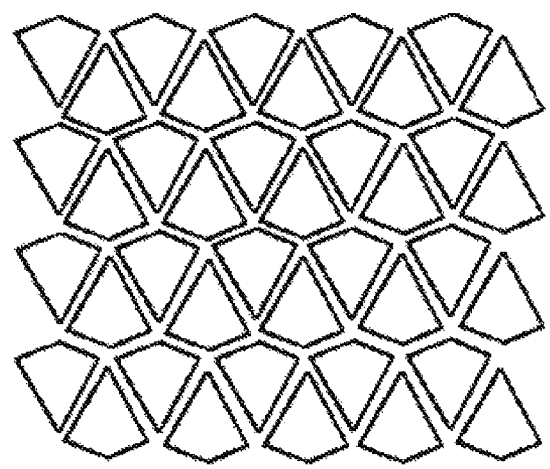

In reference to FIG. 1 Keyboard with rows of alternating offset inverted tapering keys (or key blocks) that give each key row a traversing linear horizontal row profile that correlates with the linear row above and/or below. Keys or keyblocks taper vertically and are inverted alternately, along with being offset vertically, the top or bottom of the key or key block is raised or lowered in comparison to its immediate neighbours left or right. With alternating inverted offset tapering shaped keys or key blocks, the row linear traverses in direct relation with each successive key or key block offset that will correlate with and utilise the traversment of the key row above and/or below.

Figure 2:
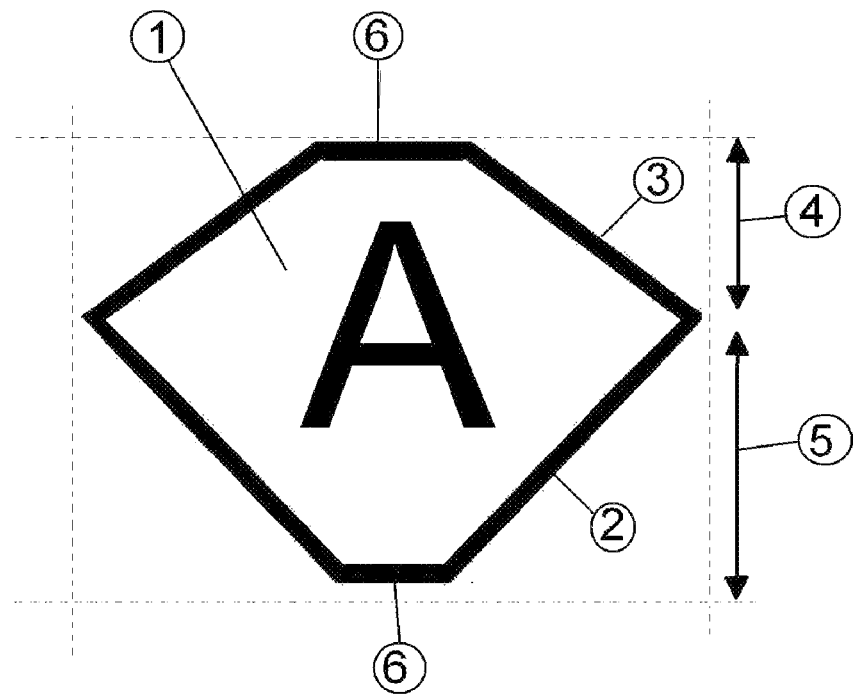
FIG. 2 is an illustration of how the keys or keyblocks are augmented
Figure 3:
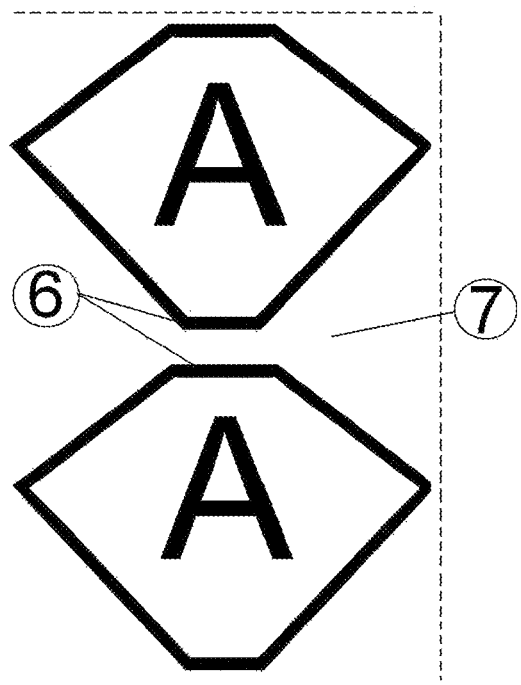
FIG. 3 is an illustration of 2 keys positioned on top of each other

In reference to FIGS. 2 and 3 each key or key block (1) tapers at the top (2) and the bottom (3). The tapering of the key or keyblock is unequal in height at the top (4) in comparison to the bottom (5), so as the key or keyblock is given an unequal shape top to bottom, that is to say the lower taper (3) is of different size to the upper (2). The points or tips (6) the key or keyblock tapers to at the top and bottom are in size similar in width across so as to be narrower than the keys entire width, one key or keyblock can be stacked either way on top of another key or keyblock to have recesses (7) where the keys meet in the column. The key or keyblock is reasonably symmetrical vertically and equal, the right half mirrors the left or as near as is reasonable.

Figure 4:
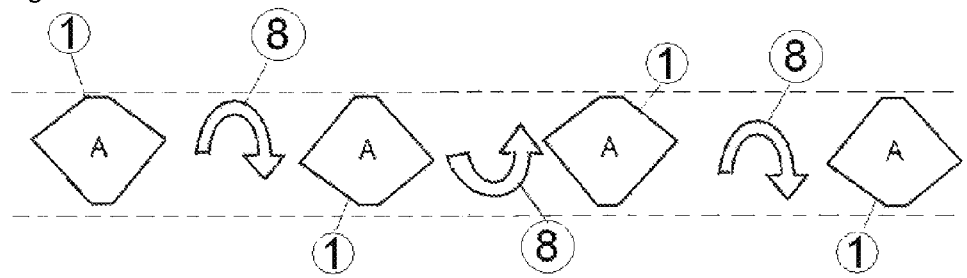
FIG. 4 is an illustration the inversion of the keys in the key row

In reference to FIG. 4 Each tapering key or keyblock is inverted (8). The key or keyblock is rotated through 180 degrees in relation to its immediate neighbouring keys or keyblocks in the key row. The uneven taper of each key's top and bottom is at opposites in orientation to its immediate neighbouring keys or keyblocks left or right. When the larger tapers on the top of one key or keyblock, its immediate neighbours on the row have their larger taper on the bottom of the key.

Figure 5:
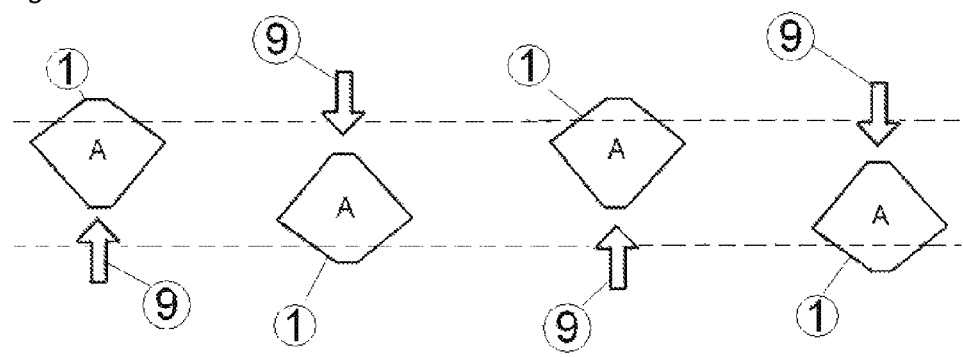
FIG. 5 is an illustration of the offsetting of the keys in the key row

In reference to FIG. 5 The tapering keys or keyblocks or keyblocks as stated are alternatively inverted. These inverted keys or keyblocks are offset from the straight horizontal line in the row. That is say each key or keyblock is moved vertically (9) up or down in relation to its immediate neighbours in the key row. The extremities of each alternate key or keyblock reach further up or down in comparison to its immediate neighbours in the key row. The direction each key or keyblock is offset is towards the end with the smaller taper so as the smaller taper is extending above the adjoining key or keyblock and the larger taper of each key or keyblock is moved towards the smaller tapers end and towards the centre of the row.

Figure 6:
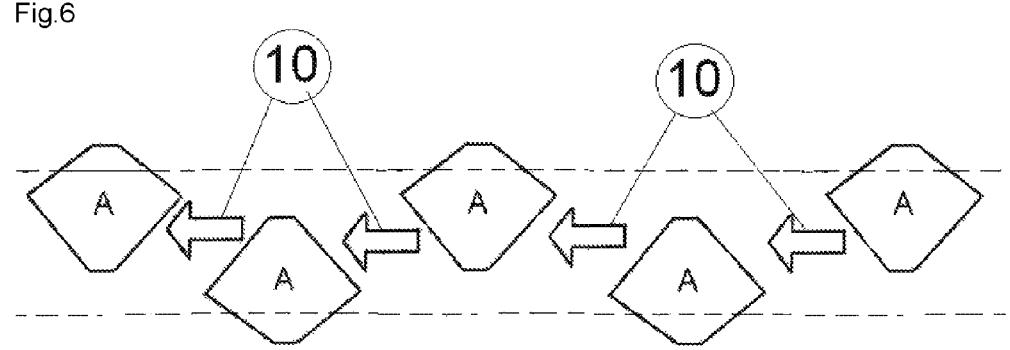
FIG. 6 is an illustration of the correlation between the keys
Figure 7:
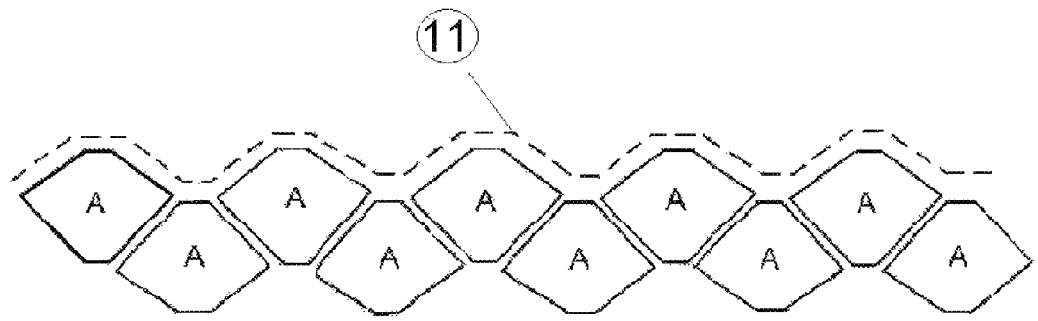
FIG. 7 is an illustration of a fully complete traversing key row

In reference to FIGS. 6 & 7 The larger taper of the keys or keyblocks is moved horizontally (10) towards the neighbouring keys or keyblocks larger taper and because the keys or keyblocks are inverted 180 degrees and offset, the larger tapers correlate with each other as they are horizontally symmetrical and reasonably identical and are mirror opposites due to the inversion. Each inversion meets with the keys or keyblocks to its left and or right, correlating with each other, forming a constant key row.

Figure 8:
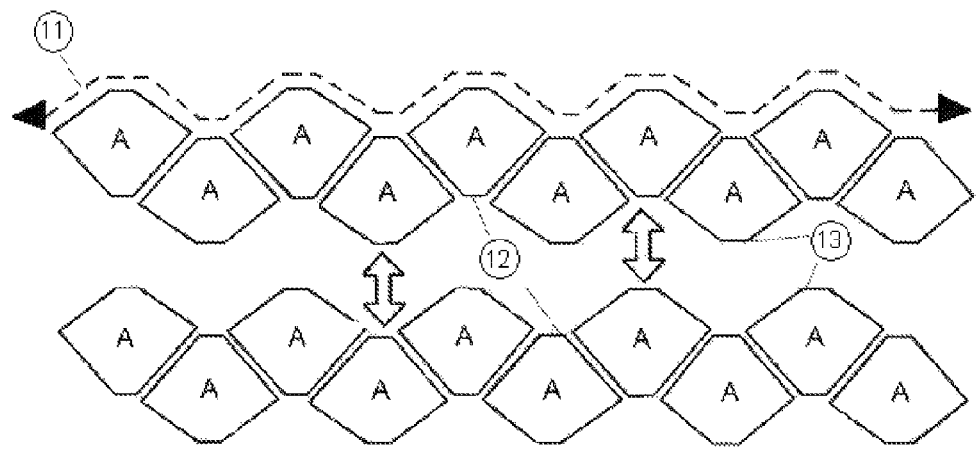
FIG. 8 is an illustration of the correlation between stacked keyrows

In reference to FIGS. 7 & 8 The alternately inverted keys or keyblocks that are offset up or down, the extremities of each key or keyblock being higher or lower than that of its immediate neighbours left or right, the large tapers joining to form a row of tapering offset inverted keys or keyblocks. The smaller taper takes position alternately on the top or bottom edges of the key row with each alternate key forming the row profile (11), so the key row profiles acquire an undulating shape with a softened, open obtuse appearance and open profile, a smooth change of direction with each offsetting of each key without sharp changes in the lower profile of the key row.

In reference to FIG. 8 the key row is given a smooth traverse pattern where the horizontal row rises and falls with each successive key, the zigzagging up and down is obedient to the position of each key. The linear row profile (11) of the offset inverted tapering key rows correlate and tessellate with the linear profile (11) of the key rows above and or beneath. The trough of one key row traversement (12) is met by the crest of another (13), the convex of one row extending unto the concave of the row above and or beneath, so as the rows integrate with and correlate to each other The tips of each key or keyblock (6) are vertically above each other so as the rows can be stacked on top of one another in a correlating arrangement.

Figure 9:
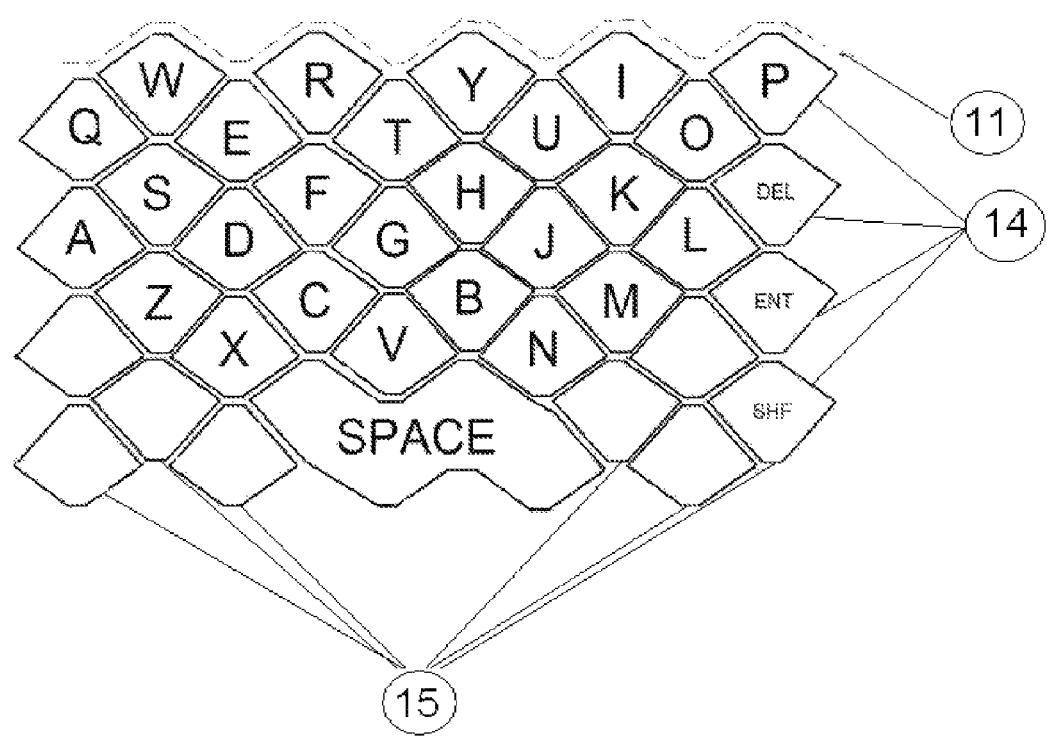
FIG. 9 is an illustration of a complete QWERTY keyboard in this method of construction

In reference to FIG. 9 the entirety of the keyboard has a tessellation that correlates in a repeated pattern. The keys or keyblocks in the key rows in their orientation and position form a tessellating pattern throughout the keyboard, with the rows (14) and columns (15) clearly defined which intermesh with the rows above and beneath.

The invention claimed is:
1. A keyboard comprising of multiple keys or keyblocks which have a two ended and two sided taper with the taper being larger in height at one end of the keys or keyblocks in comparison to the other;
   the keys or keyblocks divided into four section quadrants, with two separate end quadrants comprising an end and two separate side quadrants representing a side, the key or keyblock quadrants being separately higher at one end of the key or keyblock in comparison to the other;
   the total width of tapering parts of end quadrants when combined as a horizontal pair, being separately of at least 33% of the key or keyblocks total width each end pair quadrants;
   the total height of the tapering parts of the key or keyblock side quadrants top and bottom when combined as a vertical pair being at least 50% of the key or keyblock total height each side quadrant pair;
   the separate height of the taper of the key side quadrants have a ratio of less than 1:5, where the taper height of the top quadrant and separately the taper height of the bottom adjacent quadrant do not exceed being five times greater in height than the taper of the aforementioned opposing end quadrant;
   wherein the total said taper width of the key or keyblock horizontal end quadrant pair being of lesser in ratio 1:2 when compared to the taper width of the opposite end horizontal pair of quadrants, so when combined as a horizontal pair the taper of end quadrants do not exceed being two times greater in width than the taper of the pair of quadrants at the opposing end;

with each key or keyblock in the keyrow alternately inverted 180 degrees and then offset vertically up or down from the center of the keyrow towards the end of the key or keyblock with the smaller height quadrant away vertically from its neighboring inverted key or keyblocks in the key row, so each key or keyblock is higher or lower in orientation than its immediate neighbors on the keyrow, with the side taper that is larger in height correlating with the larger side taper of its neighboring inverted keys or keyblocks on the key row, so with the smaller sides and tapers being positioned at the outside of the keyrow either upon the top or alternately upon the bottom, with multiple successive alternate inverted key or keyblocks aligned in the keyrow a traverse zigzag horizontal row profile is imparted into the keyrow, which then correlates with the traversing row profile of the keyrow above and/or below, so owing to the unequal length taper sides, inversion and offsetting of said keys or keyblocks, two distinct and separate interdependent intermeshing correlations are created, firstly a correlating pattern between the inverted tapering keys or keyblocks in their keyrow and secondly the pattern between the traversing row profile of keyrows in the keyboard with wider keys in a conventional row and column format, a system between the key or keyblocks and key rows is created to give wider dimensions to keys whilst simultaneously utilizing the area of adjacent keys above and below and to the sides, with keys or keyblocks simultaneously intermeshing and correlating to the keys above and/or below and to the sides.

* * * * *